(12) United States Patent
Ranney

(10) Patent No.: US 7,959,031 B2
(45) Date of Patent: Jun. 14, 2011

(54) METHOD FOR METERING AND DISPENSING DEVICE

(76) Inventor: Fredrik J. Ranney, Dayton, NJ (US)

( * ) Notice: Subject to any disclaimer, the term of this patent is extended or adjusted under 35 U.S.C. 154(b) by 393 days.

(21) Appl. No.: 12/229,814

(22) Filed: Aug. 27, 2008

(65) Prior Publication Data

US 2009/0001104 A1 Jan. 1, 2009

Related U.S. Application Data

(62) Division of application No. 11/173,959, filed on Jul. 1, 2005, now Pat. No. 7,451,901.

(51) Int. Cl.
*G01F 11/28* (2006.01)
(52) U.S. Cl. ............ 222/1; 222/370; 222/438; 222/450
(58) Field of Classification Search .................. 222/370, 222/242.5, 425, 434, 436, 438, 444, 450, 222/452, 454, 424.5, 1

See application file for complete search history.

(56) References Cited

U.S. PATENT DOCUMENTS

| | | | |
|---|---|---|---|
| 1,864,936 A | 6/1932 | Reineking | |
| 2,710,118 A | 6/1955 | Stoddard | 222/266 |
| 3,179,303 A | 4/1965 | Dankoff et al. | 222/248 |
| 3,201,004 A | 8/1965 | Plonski | 222/228 |
| 3,207,371 A | 9/1965 | Stone | 222/48 |
| 3,347,425 A | 10/1967 | Beushausen et al. | 222/305 |
| 3,973,704 A | 8/1976 | Horowitz | 222/361 |
| 4,032,050 A | 6/1977 | Funk | 222/284 |
| 4,071,171 A | 1/1978 | Bassignani | 222/305 |
| 4,162,751 A | 7/1979 | Hetland et al. | 222/293 |
| 4,174,058 A | 11/1979 | Bassignani | 222/438 |
| 4,345,700 A | 8/1982 | Souza | 222/438 |
| 4,560,092 A | 12/1985 | Souza | 222/168 |
| 4,705,196 A | 11/1987 | Jang | 222/439 |
| 4,961,521 A | 10/1990 | Eckman | 222/142.5 |
| 5,465,871 A | 11/1995 | Robbins, III | 222/23 |
| 5,477,895 A | 12/1995 | Willard | 141/22 |
| 5,509,582 A | 4/1996 | Robbins, III | 222/158 |
| 5,547,109 A | 8/1996 | Robbins, III | 222/158 |
| 5,588,563 A | 12/1996 | Liu | 222/158 |
| 5,601,213 A | 2/1997 | Daniello | 222/456 |
| 5,645,197 A | 7/1997 | Chen | 222/305 |
| 5,676,282 A | 10/1997 | Satterfield | 222/307 |
| 5,772,086 A | 6/1998 | Krafft | 222/438 |
| 5,937,920 A | 8/1999 | Simmel et al. | 141/346 |
| 6,269,971 B1 | 8/2001 | Nystrom et al. | 221/13 |
| 6,550,640 B2 | 4/2003 | Smith | 222/1 |
| 6,601,734 B1 | 8/2003 | Smith | 222/142.9 |

*Primary Examiner* — J. Casimer Jacyna
(74) *Attorney, Agent, or Firm* — Watov & Kipnes, P.C.; Kenneth Watov

(57) ABSTRACT

A method for a metering and dispensing device for free flowing materials includes a volume body having first and second ends, and a volumetric channel extending therethrough. The second end of the volume body is adapted for attachment to the opening of a container holding the free flowing material. The device further includes a measuring partition operatively associated with the second end of the volume body. The measuring partition includes a barrier lip portion extending therefrom into the volumetric channel, and a measuring opening selectively movable from a closed position to an open position relative to the volumetric channel, wherein the selective movement of the measuring opening simultaneously causes the barrier lip portion to vary the volume of the volumetric channel relative to the measuring opening. The device further includes a feed partition proximate the second end of the volume body, operatively associated with the measuring partition, the feed partition including a feed opening selectively movable from a closed position to an open position relative to the measuring opening. The device also includes a discharge partition operatively associated with the first end of the volume body, which includes a discharge opening selectively movable from a closed position to an open position relative to the volumetric channel.

5 Claims, 17 Drawing Sheets

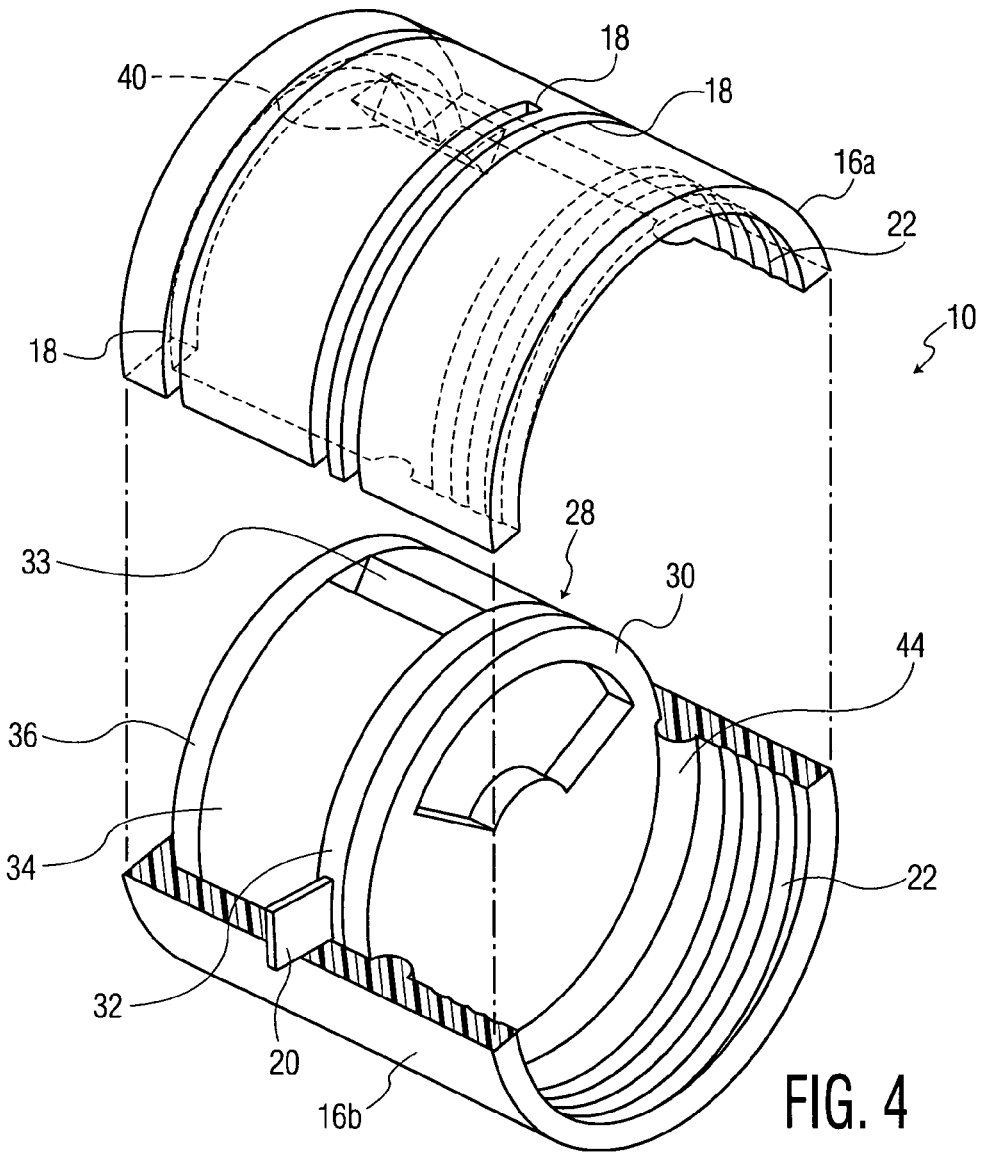
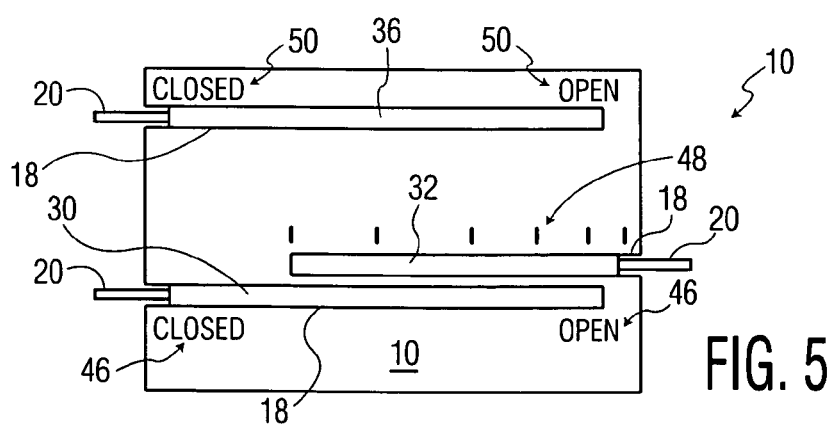

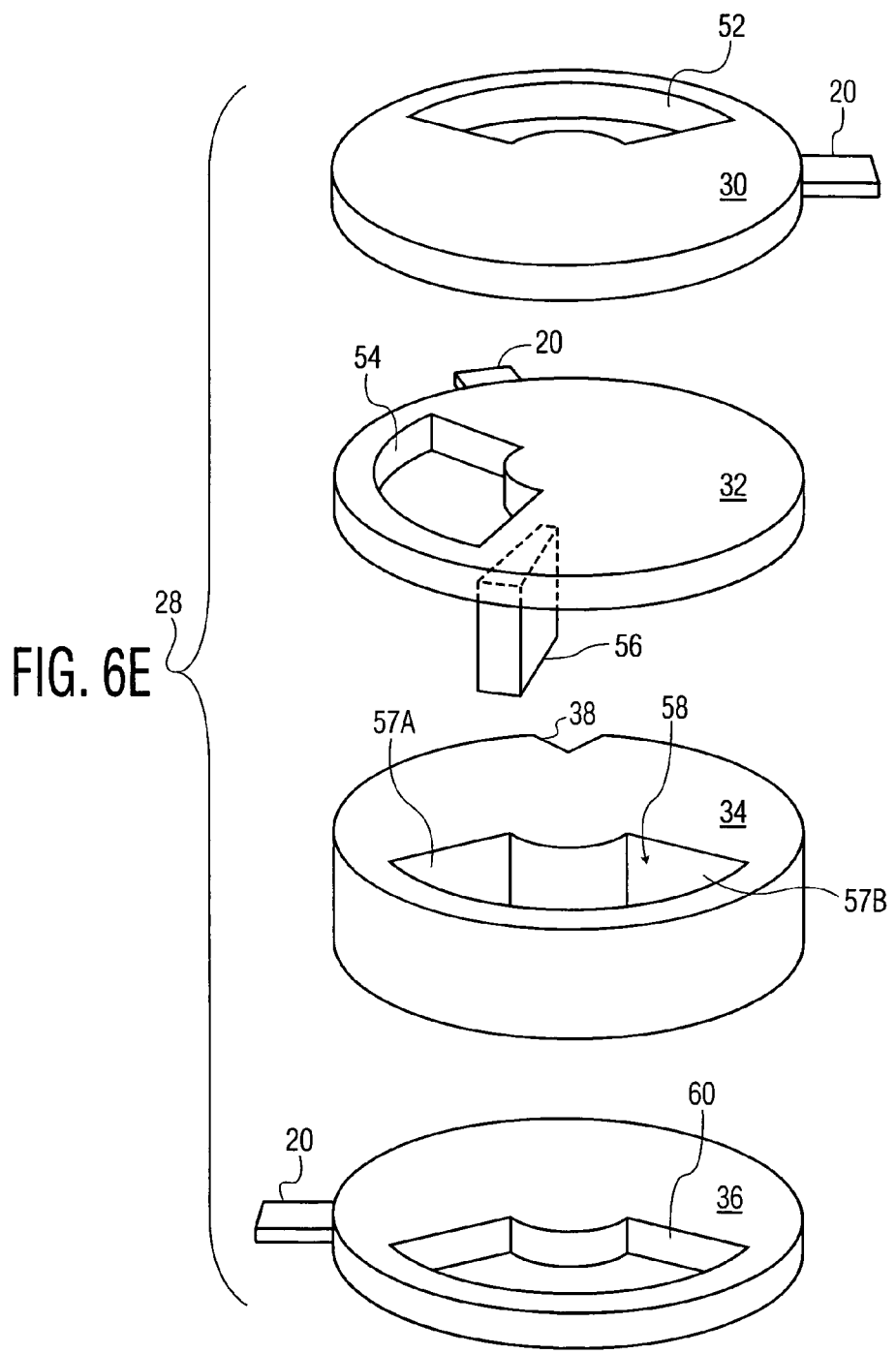

METHOD FOR METERING AND DISPENSING DEVICE

RELATED APPLICATION

This Application is a Divisional from prior application Ser. No. 11/173,959, filed Jul. 1, 2005 now U.S. Pat. No. 7,451,901, for "Metering And Dispensing Device."

FIELD OF THE INVENTION

The present invention relates generally to particulate measuring devices, and more particularly to an improved metering and dispensing device for free flowing materials including particulates, granulates and powders.

BACKGROUND OF THE INVENTION

People working in the culinary arts, and homemakers have used measuring spoons over the years to measure free flowing materials of various kinds including a flake or particulate material, such as for example, granular or powder materials, including spices, flour, sugar, salt, pepper, artificial sweeteners, and so forth, for example. Typically, a person measures a quantity of a powder or granular material by selecting a measuring spoon or cup having a desired capacity. The material to be measured is poured into the selected measuring spoon or cup to full volume. The user thereafter dispenses the material from the spoon or cup in the measured amount as desired.

The above method of using the measuring spoon or cup is often inefficient, unsanitary and burdensome to the user. The measuring cups or spoons must be washed and stored away in between uses. Such measuring cups or spoons also require the user to open the container or jar storing the materials, and scoop or pour the correct amount without spilling the material on the countertop or the floor or contaminating the material in the container.

For the foregoing reasons, there is a need for an improved metering and dispensing device for free flowing materials, that can be attached directly to the opening of a container holding the free flowing material, provide accurate and precise product measurement without the mess and problems associated with measuring spoons or cups, and is simple to construct and implement. There is a further need for an improved metering and dispensing device that is compact, sanitary and cost efficient and that substantially minimizes unnecessary contact with the product, while remaining simple to use. There is also a need for an improved metering and dispensing device that can be used by those with limited dexterity including the elderly or infirmed.

SUMMARY OF THE INVENTION

The present invention relates to an improved metering and dispensing device for free flowing materials including powders, granulates, particulates, and the like. The device of the present invention is adapted for operation with any suitable container holding a product in the form of a free flowing material. More specifically, the device of the present invention is configured to be attached to the opening of the container. The device of the present invention includes a plurality of discs, some of which are rotatable, and others of which are fixed in position, all of which are retained in a substantially cylindrical housing through which the product can pass. In one embodiment of the present invention, the device includes a feed disc, a measuring disc, a volume disc and a discharge disc, stacked successively together in the order given between the end of the housing adapted for connection to a container, and the opposing end of the housing. The volume disc is fixed in position, and includes a chamber or channel of specific volume that is open at the top and bottom faces of the disc. The feed disc includes an aperture in one portion, whereby the disc is selectively rotatable for permitting material to flow from a container through its aperture into the chamber of the volume disc, or for blocking such flow. The measuring disc is rotatable for positioning barrier means within the chamber of said volume disc, for selectively controlling the volume of the chamber to receive material into its open top portion. The discharge disc includes an aperture, the disc being selectively rotatable to an open position for permitting material flow from the chamber of the volume disc through the aperture for discharge from the device.

To use the device, a user first attaches it to the open top of a container for the desired particulate material. With the container kept upright, the discharge disc is rotated to its closed position, and the feed disc to its open position. The measuring disc is rotated to select the desired quantity or amount of particulate material to be dispensed. Next the container is inverted or turned upside down to cause particulate material to flow from the container, through an aperture in the feed disc, into the selected volume of the chamber of the volume disc, to fill the portion of the chamber selected. After filling the exposed portion of the chamber, the feed disc is rotated to its closed position. The container with the present device can be placed upright until the material is to be dispensed from the device. To dispense the material, the device either alone or attached to the container, is inverted and its top or discharge end is positioned over a bowl or receptacle to receive the material, and the discharge disc is rotated to its open position to dispense the material. Note that alternatively, before inverting the device, the discharge disc can be rotated to its open position, but care must be taken to insure that when the device is inverted, the material flowing from the volume disc chamber through the discharge disc aperture is deposited into the receptacle and not otherwise spilled. Note that a free flow of material from the container can be provided by rotating both the feed and discharge discs to their respective open positions, thereby when the device is inverted material will free flow from the container through the aperture in the feed disc, the exposed chamber or volumetric channel of the volume disc, and out of the aperture in the discharge disc.

The device minimizes the user's contact with the product during the metering and dispensing operation. The device and the container can subsequently be stored away as a single unit.

The device of the present invention enables precise metering of the free flowing product or material in a simple and prompt manner, while substantially minimizing the possibility of spillage, contamination, and unwanted dispensing. The device of the present invention is especially suitable for use by those with limited dexterity or "unsteady" hands such as children, elderly people and the infirm. The device of the present invention is further compact, simple to operate, and has a pleasing appearance.

In one aspect of the present invention, there is provided a metering and dispensing device for free flowing materials, comprising:

a volume body having first and second ends, and a volumetric channel extending therethrough, the second end being adapted for attachment to a container;

a measuring partition operatively associated with the second end of the volume body, the measuring partition including a barrier lip portion extending therefrom into the volumetric channel, and an opening in an otherwise closed portion, said measuring partition being selectively movable from a closed position to an open position relative to the volumetric channel, wherein the selective movement of the measuring opening simultaneously causes the barrier lip portion to vary the volume of the volumetric channel relative to the measuring opening, for selecting a volume of material to be dispensed;

a feed partition operatively associated with the measuring partition, the feed partition including a feed opening selectively movable from a closed position to an open position relative to the measuring opening, whereby the open position permits particulate material to flow from said container when inverted into the selected volume of the volumetric channel; and a discharge partition operatively associated with the first end of the volume body, the discharge partition including a discharge opening selectively movable from a closed position to an open position relative to the volumetric channel, for permitting material to flow from the volumetric channel through the discharge opening for dispensing when the device is inverted.

BRIEF DESCRIPTION OF THE DRAWINGS

Various embodiments of the invention are described in detail below with reference to the drawings, in which like items are identified by the same reference designation, wherein:

FIG. 4 is an exploded assembly view of the device in accordance with one embodiment of the present invention;

FIG. 5 is a front elevational view of the device in accordance with one embodiment of the present invention;

FIG. 6E is an exploded assembly view of the discs shown relative to one another in a fifth mode of operation in accordance with one embodiment of the present invention;

DETAILED DESCRIPTION OF THE INVENTION

The present invention is directed to an improved metering and dispensing device for free flowing particulate materials, such as powders, spices, flour, sugar, salt, and pepper, for example. The device of the present invention is adapted for operation with any suitable container holding a product in the form of a free flowing material. More specifically, the device of the present invention is attached to the opening of such containers or receptacles. The device substantially facilitates the metering and dispensing of the product from the corresponding container. The device of the present invention includes a series of movable discs retained in a substantially cylindrical housing through which the product can pass. In one embodiment of the present invention, the device includes a feed disc, a measuring disc, a volume disc and a discharge disc. The user operates the movable discs to obtain the desired amount of the product for dispensing from the container, as will be described in detail below. In this manner, there is typically no need to wash the device between uses, or to disengage the device from the container during non-use. Furthermore, the device minimizes the user's contact with the product during the metering and dispensing operation. The device and the container can subsequently be stored away as a single unit, or separately.

In one embodiment of the present invention, there is provided a metering and dispensing device for free flowing materials which comprises a volume body having first and second ends, and a volumetric channel or chamber extending therethrough. The second end of the volume body is adapted for attachment to the opening of a container holding the free flowing material. The device further includes a measuring partition operatively associated with the second end of the volume body. The measuring partition includes a barrier lip portion extending therefrom into the volumetric channel with a measuring opening selectively movable from a closed position to an open position relative to the volumetric channel, whereby the selective movement of the measuring opening simultaneously causes the barrier lip portion to vary the volume of the volumetric channel relative to the measuring opening. The device further includes a feed partition operatively associated with the measuring partition, which includes a feed opening selectively movable from a closed position to an open position relative to the measuring opening. The device includes a discharge partition operatively associated with the first end of the volume body, which includes a discharge opening selectively movable from a closed position to an open position relative to the volumetric channel for dispensing material therefrom.

Figure 1A:
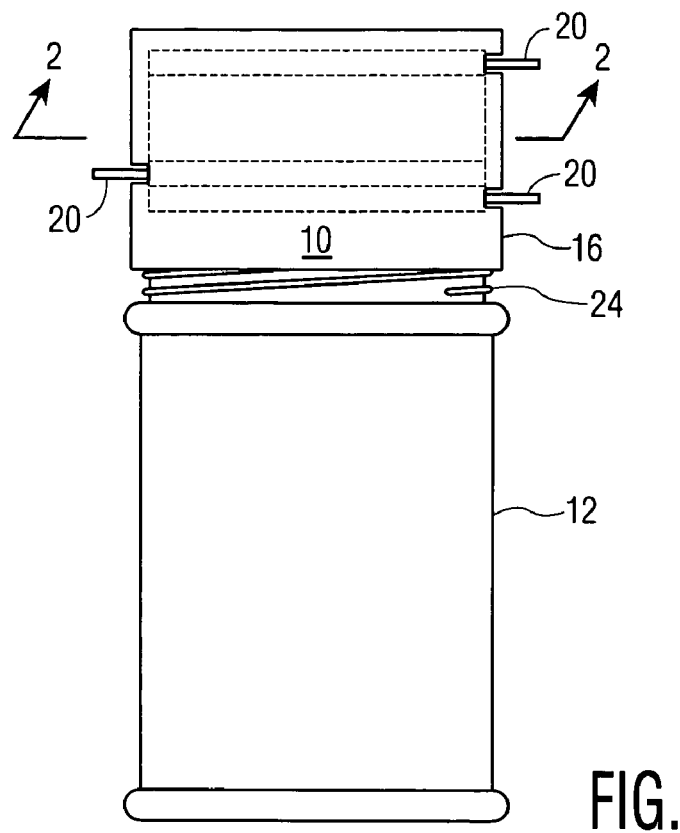
FIG. 1A is a rear elevational view of a metering and dispensing device secured to a container for one embodiment of the present invention.
Figure 1B:
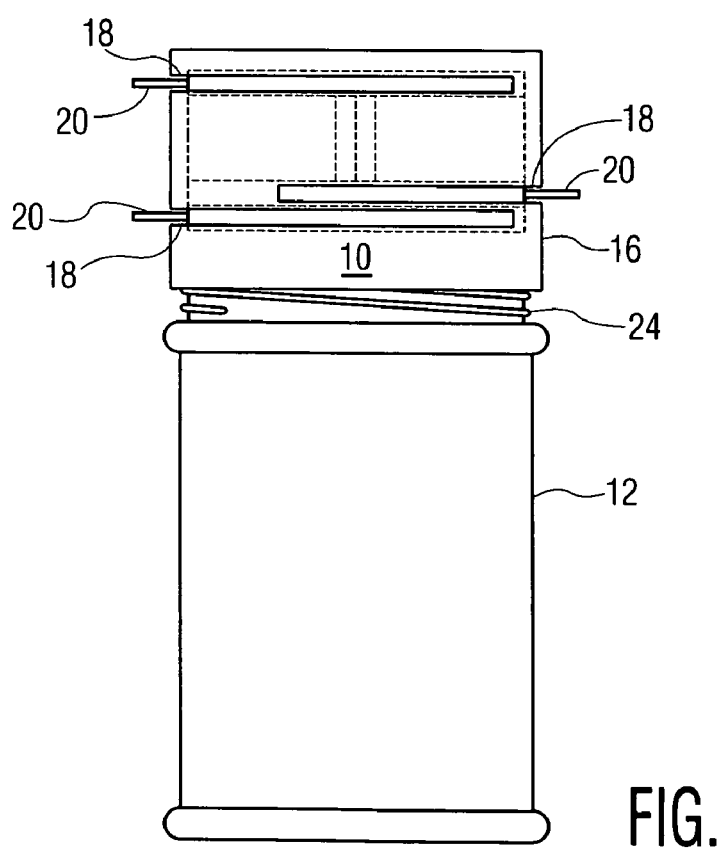
FIG. 1B is a front elevational view of the device and container of FIG. 1A in accordance with the present invention.
Figure 2:
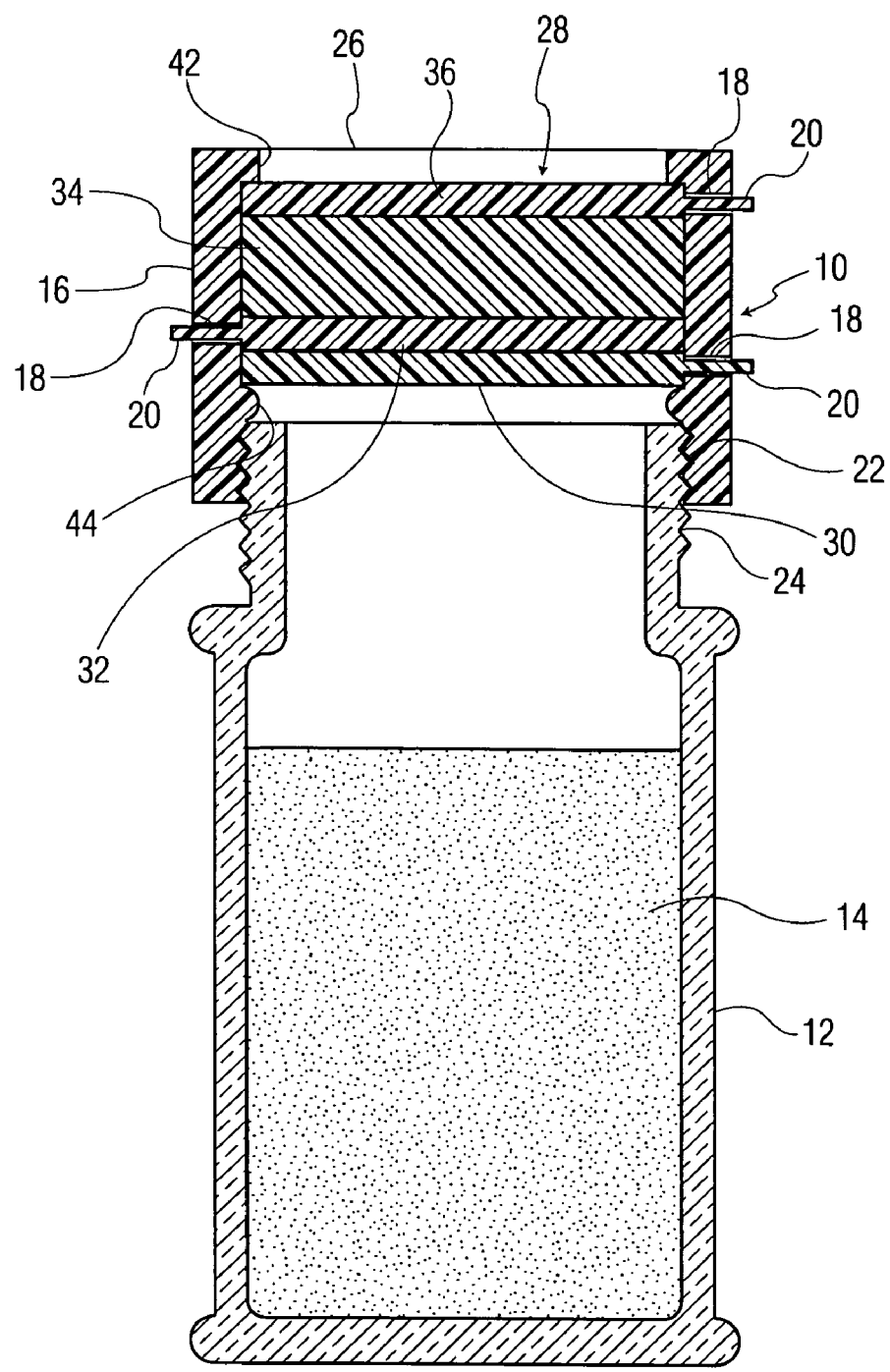
FIG. 2 is a longitudinal cross sectional view of the device and container along lines 2-2 of FIG. 1A in accordance with the present invention.

Referring to FIGS. 1A and 1B, one embodiment of a metering and dispensing device is shown and identified generally by reference numeral 10 in accordance with the present invention. The metering and dispensing device, referred to hereinafter as device 10, is shown attached to a container 12 holding a free flowing material 14 such as particulates, granulates, powders, and the like (as best shown in FIG. 2). The device 10 includes a substantially cylindrical housing 16 having three side slots 18 extending along side portions thereof, and three slidable tabs 20 each occupying a corresponding slot 18. At one end, the cylindrical housing 16 includes an internal threaded portion 22 (as shown best in FIG. 2) in operative association with an external threaded portion 24 of the container 12 for implementing secure coupling engagement therebetween. During usage, the user operates the slidable tabs 20 to perform metering and dispensing operations. The free flowing material 14 is dispensed on the opposed or top end of the device 10 through an opening 26 (as shown best in FIG. 2). During storage, the device 10 and container 12 can be stowed away as a single unit or individually for subsequent use.

Referring to FIG. 2, the cylindrical housing 16 retains a metering and feed assembly 28 composed of a feed disc 30, a measuring disc 32, a volume disc 34 and a discharge disc 36. The feed disc 30, the measuring disc 32, and the discharge disc 36 are each freely rotatable by the movement of their respective associated tab 20 within the slots 18. The volume disc 34 remains fixed and stationary within the housing 16. The metering and dispensing assembly 28 is retained at both ends within the housing 16 by a ledge portion 42 extending around the periphery of the opening 26, and a ring-like protruding portion 44 extending along the circumference of the housing 16 proximate the internal threaded portion 22. The protrusion portion 44 interacts with the feed disc 30 to prevent the passing of the free flowing material 14 between the housing 16 and the assembly 28, thus substantially minimizing inadvertent leakage.

During operation, the user manipulates the corresponding tabs 20 with the container 12 at least substantially inverted to perform the metering and dispensing operations as will be further described hereinafter. The container 12 is inverted to furnish and feed the free flowing material 14 to the metering and feed assembly 28. The free flowing material 14 stored within the container 12 can be passed through apertures or openings in the feed disc 30 and the measuring disc 32 into a chamber or channel of the volume disc 34, during the metering operation. Once the metering operation is completed, the measured portion of the free flowing material 14 can be passed through an aperture in the discharge disc 36 from the volume disc 34 for dispensing.

Figure 3A:
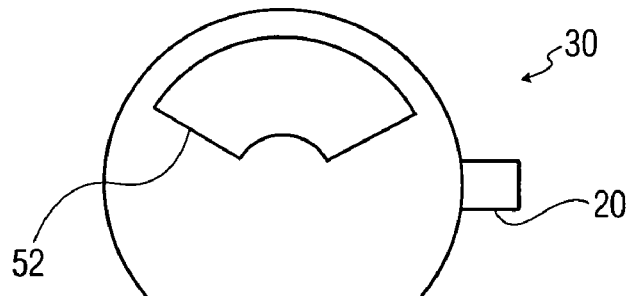
FIG. 3A is a top plan view of a feed disc of the device in accordance with one embodiment of the present invention.
Figure 3B:
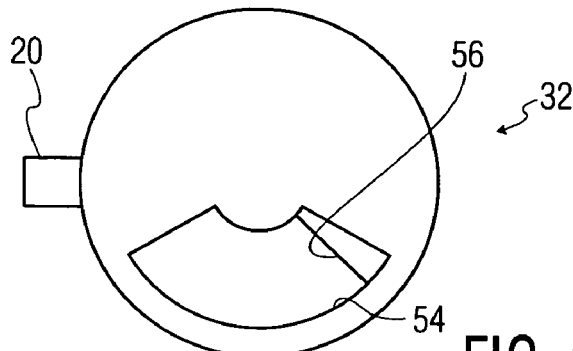
FIG. 3B is a top plan view of a measuring disc of the device in accordance with one embodiment of the present invention.
Figure 3C:
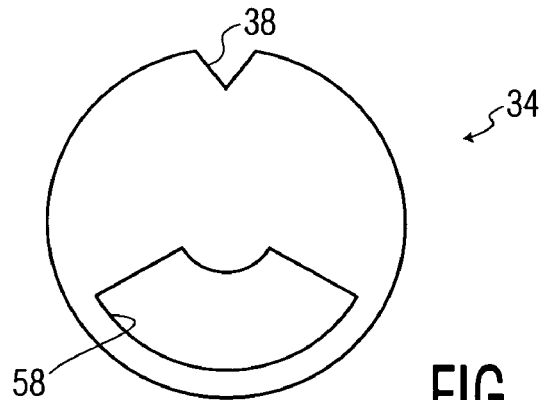
FIG. 3C is a top plan view of a volume disc of the device in accordance with one embodiment of the present invention.

Referring to FIGS. 3A through 3D, top plan views of the component parts of the metering and dispensing assembly 28 are shown. As shown in FIG. 3A, the feed disc 30 includes the tab 20 extending radially outward, and a feed aperture or opening 52 extending therethrough. As shown in FIG. 3B, the measuring disc 32 includes the tab 20 extending radially outward, a measuring aperture or opening 54 extending therethrough, and a barrier lip portion 56 (see FIG. 6A) extending away from the opening 54. As shown in FIG. 3C, the volume disc 34 includes a recessed or notched portion 38 which cooperates with an index tab 40 of the housing 16 (see FIG. 4), for locking the volume disc 34 in place. The volume disc also includes a chamber or volume channel 58 extending therethrough, and configured for receiving the barrier lip portion 56 of the measuring disc 32. The chamber or volume channel 58 has a maximum volume dependent upon the diameter and/or height of the volume disc 34, as required.

Figure 3D:
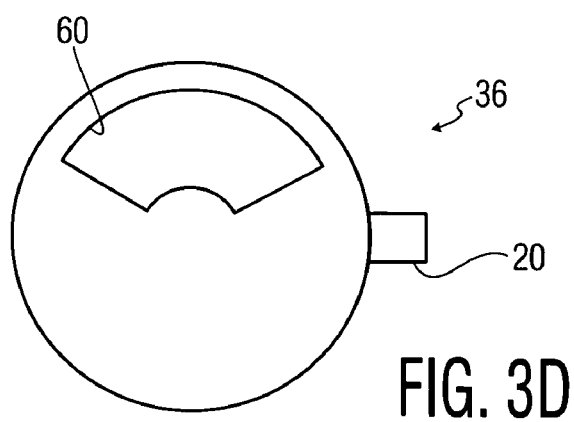
FIG. 3D is a top plan view of a discharge disc of the device in accordance with one embodiment of the present invention.

As shown in FIG. 3D, the discharge disc 36 includes the tab 20 extending radially outward, and a discharge opening 60 extending therethrough. The corresponding components of the metering and dispensing assembly 28 cooperate with one another in several modes or steps to perform the measuring and dispensing operations of the device 10 as will be described hereinafter.

Referring to FIG. 4, the cylindrical housing 16 is formed by two half portions 16a and 16b that are secured to one another via suitable fastening means. Such fastening means can be selected from welding including ultrasonic welding, adhesive techniques, and the like. Whatever fastening means is selected, it is important to seal the two halves 16a and 16b together to avoid leakage of the particulate material 14 that is passed through device 10. The metering and dispensing assembly 28 is securely disposed between the two half portions 16a and 16b with the feed disc 30, the measuring disc 32 and the discharge disc 36 freely rotatable in a range by the movement of the corresponding tabs 20 within the associated slots 18. The volume disc 34 includes the recessed portion 38 (in this example a v-shaped slot) for receiving a protrusion 40 extending radially inward from an interior portion of the housing half portion 16a. In the assembled state, the protrusion 40 functions to fix the volume disc 34 in an immobile position within the housing 16, and prevents any rotational movement of volume disc 34 therein relative to the housing 16.

The components forming the metering and dispensing assembly 28 and the cylindrical housing 16 can be composed of any suitable rigid material that is at least substantially non-reactive with the products expected to be metered and dispensed. Such suitable rigid materials can be selected from plastic, glass, ceramic, metal, wood, and the like. The size, dimension and shape of the device 10 is not limited to the embodiment shown and may vary as required by the application and/or the desired aesthetics. In other words, the dimensions of device 10 are dictated primarily by the size of the measured portions or quantities of product to be dispensed.

Referring to FIG. 5, a front side portion of the device 10 is shown for one embodiment of the present invention. The device 10 includes the three tabs 20 movable within the corresponding slots 20. The feed disc 30 is controlled through the lowermost tab 20, and can be moved between a closed position and an opened position as indicated by the corresponding indicia 46. The measuring disc 32 is controlled through the intermediate tab 20, and can be moved in graduated amounts each representing an increment of a measured volume for dispensing, as indicated by the corresponding indicia 48. The discharge disc 36 is controlled through the topmost tab 20, and can be moved between a closed position and an opened position as indicated by the corresponding indicia 50.

Referring to FIGS. 6A through 6E, the component parts of the metering and dispensing assembly 28 are shown in exploded assembly views to illustrate the positions and orientations of each component relative to one another during each mode or step of operation. The components are shown in an orientation where the container 12 is moved into an inverted position with the free flowing material 14 in contact with the feed disc 30 of the assembly 28. In this manner, the free flowing material 14 is supplied to the assembly 28 for measuring and thereafter dispensing.

Figure 6A:
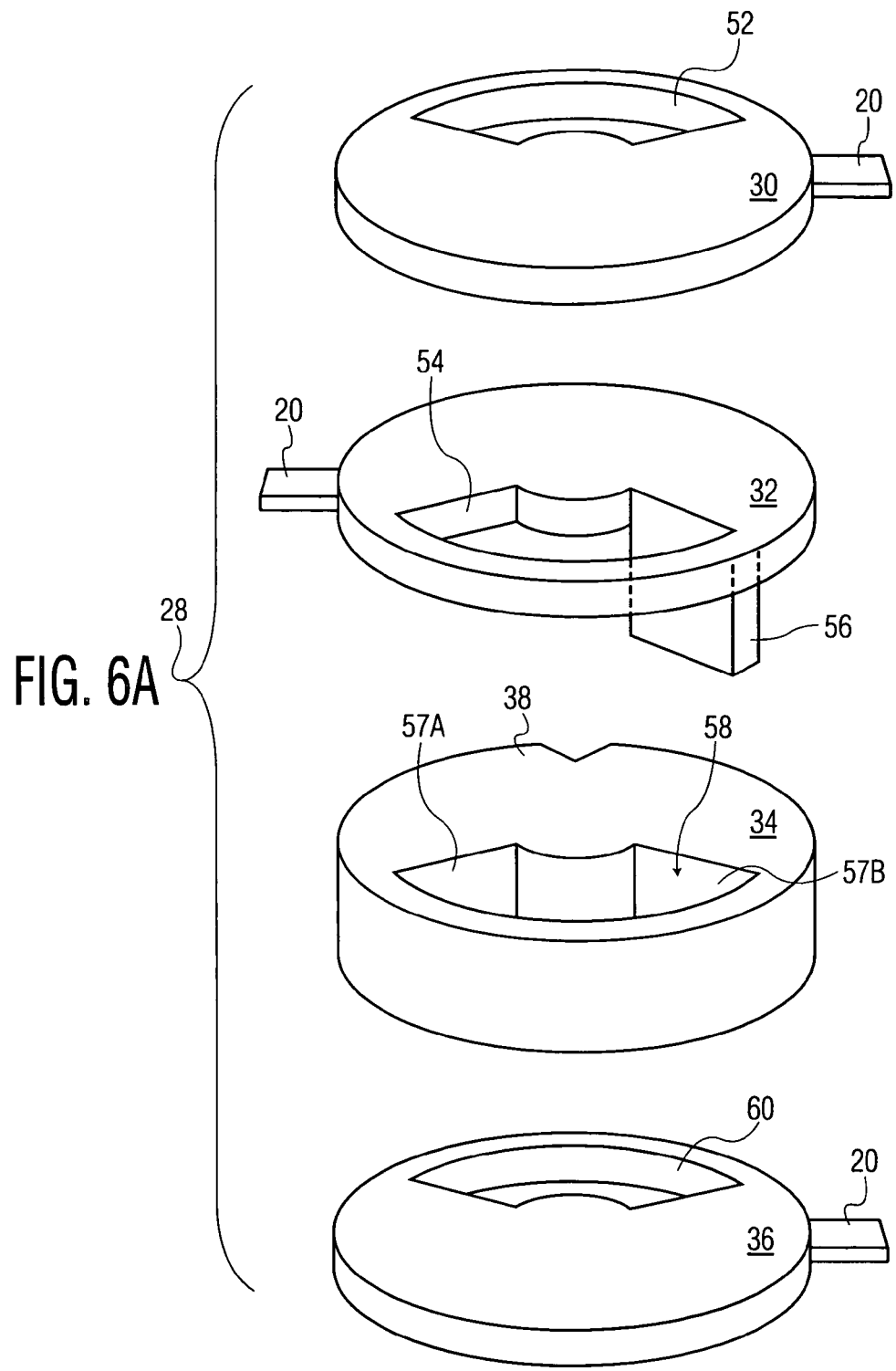
FIG. 6A is an exploded assembly view of the discs shown relative to one another in one mode of operation in accordance with one embodiment of the present invention.

As shown in FIG. 6A, the metering and dispensing assembly 28 is shown in an initial mode of operation where the feed disc 30 is oriented in a closed position relative to the volume disc 34. In the closed position, the feed opening 52 of the feed disc 30 is out of alignment with the measuring opening 54 of measuring disc 32, and the volume channel 58 of volume disc 34, thereby blocking the flow of material or product 14 from the container 12 into an exposed portion of volume channel 58. Similarly, the discharge disc 36 is oriented in a closed position relative to the volume disc 34. In the closed position, the discharge opening 60 is out of alignment with the measuring opening 54 of measuring disc 32, and the volume channel 58 of the volume disc 34, thereby blocking any flow of product 14 from volume channel 58 and through aperture or opening 60 of discharge disc 36.

The barrier lip portion 56 of the measuring disc 32 is located proximate the measuring opening 54, and extends into the volume channel 58 of the volume disc 34. The measuring disc 32 can be rotated incrementally via its tab 20 between the closed position and an open position relative to the volume disc 32. In the closed position, the measuring opening 54 of the measuring disc 32 is out of alignment with the volume channel 58, and the barrier lip portion 56 is positioned flush against the channel wall 57A effectively blocking the entire receiving volume of the volume channel 58.

In an opened position, the measuring disc 32 is rotated counter-clockwise via the tab 20 to align at least a portion of the measuring opening 54 with the volume channel 58 of the volume disc 34. This action moves the barrier lip portion 56 away from the channel wall 57A, and enlarges the receiving volume of the volume channel 58 for accommodating the free flowing material 14. The maximum volume of the volume channel 58 is obtained by rotating the measuring disc 32 counter-clockwise to position the barrier lip portion 56 flush against the channel wall 57B. In this manner, the user can adjust the receiving volume of the volume channel 58 and thus the desired quantity to be measured by rotating the measuring disc 32 incrementally via the associated tab 20 to a desired dispensing amount indicated by the indicia 48.

Figure 6B:
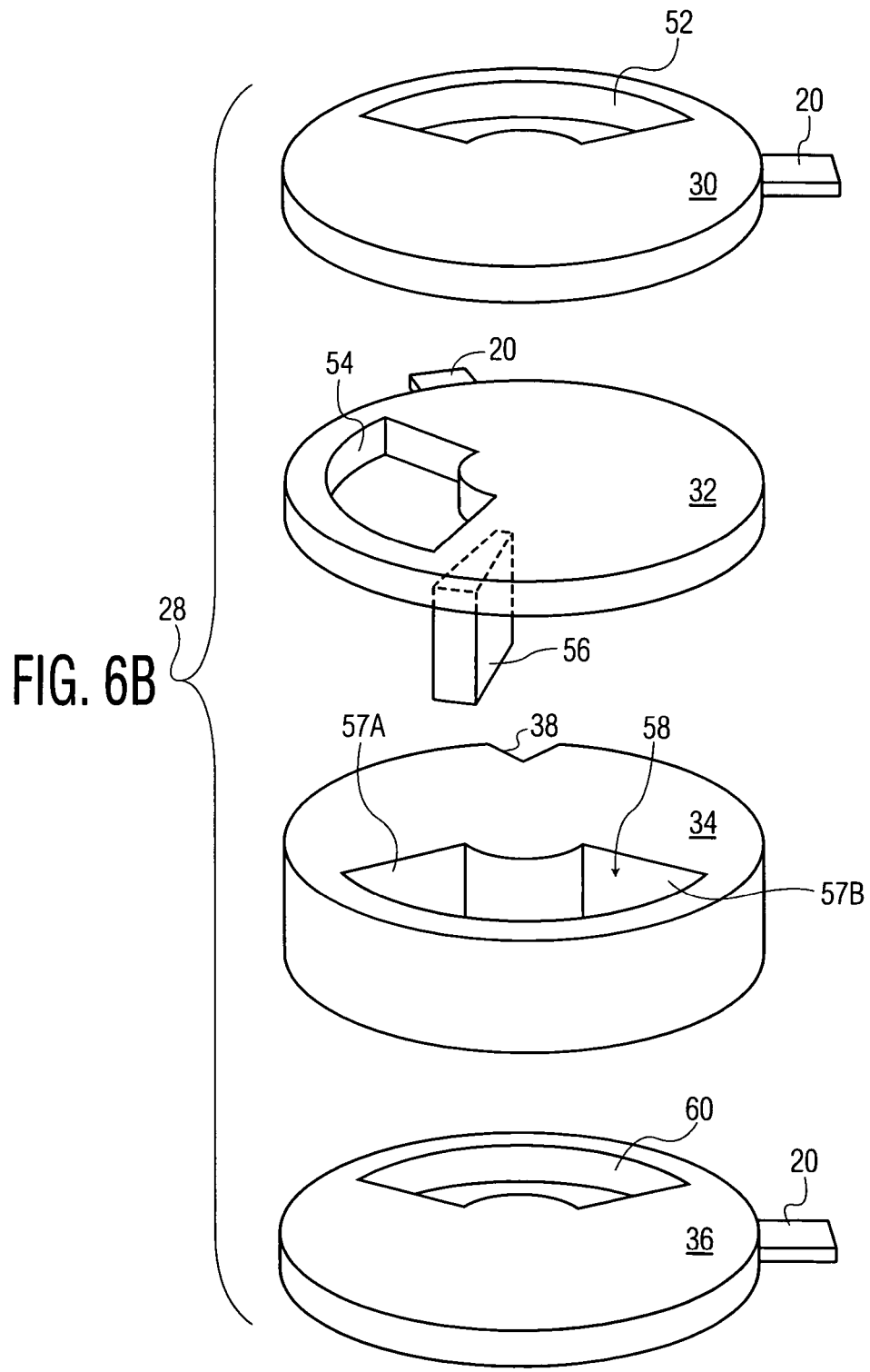
FIG. 6B is an exploded assembly view of the discs shown relative to one another in a second mode of operation in accordance with one embodiment of the present invention.
Figure 6C:
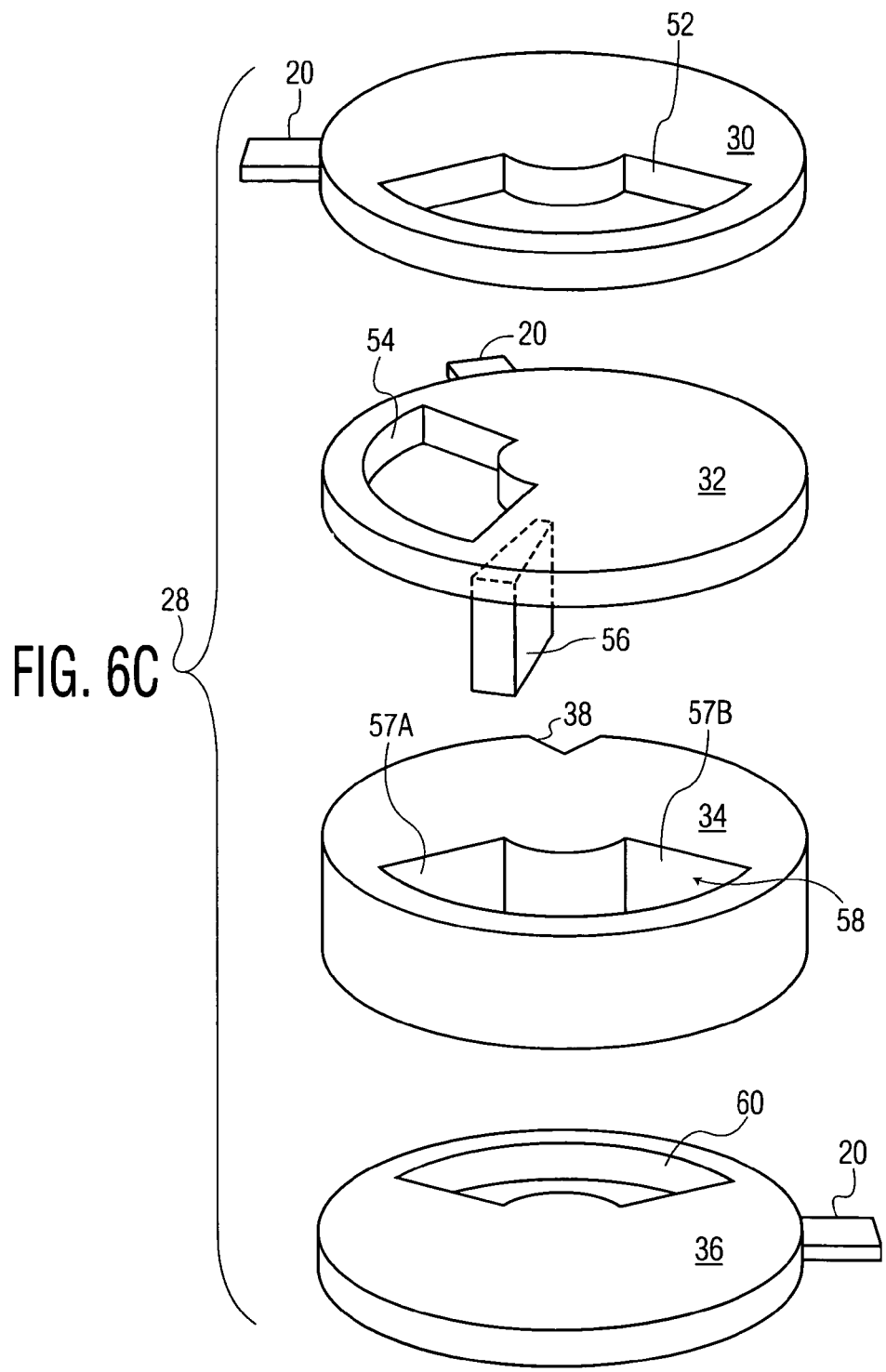
FIG. 6C is an exploded assembly view of the discs shown relative to one another in a third mode of operation in accordance with one embodiment of the present invention.

As shown in FIG. 6B, the measuring disc 32 is rotated via its tab 20 to a desired position corresponding to the desired receiving volume of the volume channel 58 as defined by the position of the barrier lip portion 56. As shown in FIG. 6C, the feed disc 30 is rotated via its tab 20 to the opened position relative to the volume disc 34. In this position, the feed opening 52 is at least in partial communication with the measuring opening 54. Accordingly, the feed opening 52 allows the free flowing material 14 from the container 12 to pass through the measuring opening 54 of the measuring disc 32 into the receiving volume of the volume channel 58.

Figure 6D:
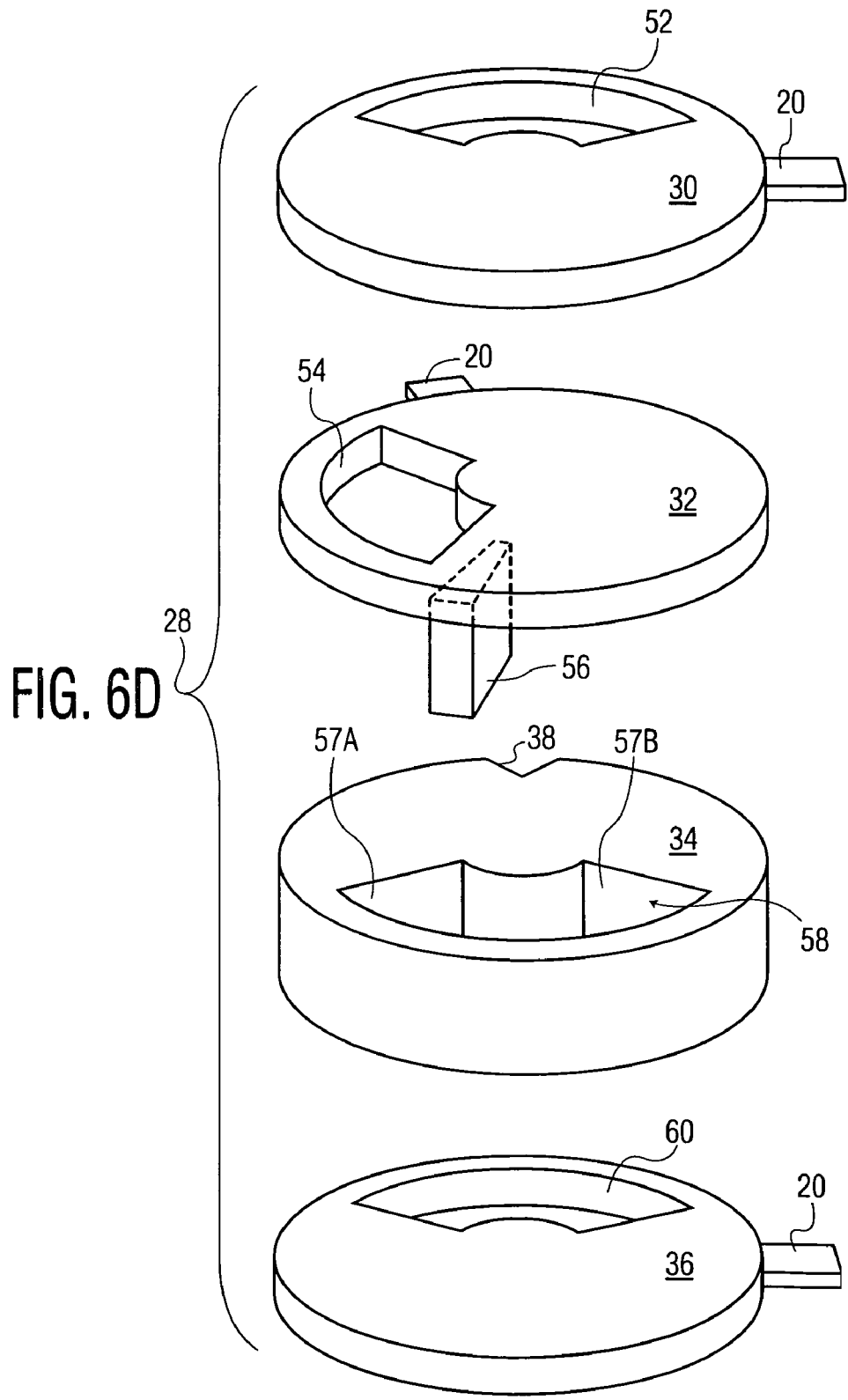
FIG. 6D is an exploded assembly view of the discs shown relative to one another in a fourth mode of operation in accordance with one embodiment of the present invention.

As shown in FIG. 6D, upon filling the measured or pre-established receiving volume of the volume channel 58 to capacity, the feed disc 30 is rotated via its tab 20 to the closed position. In this manner, the free flowing material 14 is not in communication with the measuring opening 54 and the volume channel 58. This prevents any free flowing material 14 in the container 12 from passing into the assembly 28. As shown in FIG. 6E, the discharge disc 36 is rotated via its tab 20 into the opened position, where the discharge opening 60 is in communication with the receiving volume of the volume channel 58. In this manner, the free flowing material 14 contained in the receiving volume of the volume channel 58 passes through the discharge disc 36 for dispensing the desired quantity or measured amount.

Figure 7:
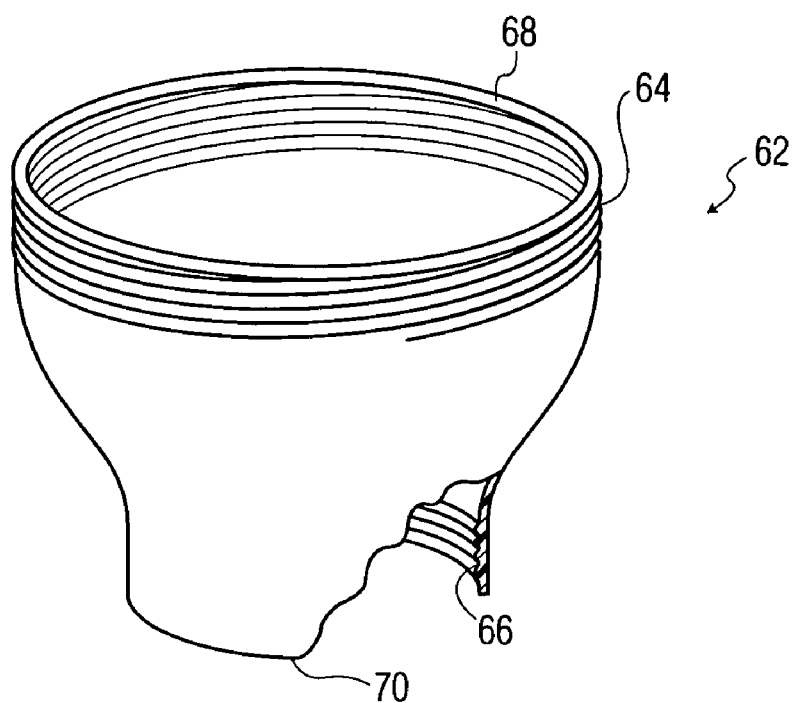
FIG. 7 is a coupling adapter for securing the device to a container for one embodiment of the present invention.

Referring to FIG. 7, a coupling adapter 62 is shown for one embodiment of the present invention. The coupling adapter 62 is designed to enable the device 10 to be coupled to externally threaded containers with smaller diameter openings. The coupling adapter 62 includes an externally threaded portion 64 extending along an upper opening 68, and an internally threaded portion 66 extending along a lower opening 70 for attachment to a smaller diameter opening of the container. The device 10 is attached to opening 68 of the adapter 62 through threaded engagement with the externally threaded portion 64. Correspondingly, the container is attached to the opening 70 of the adapter 62 through the threaded engagement with the internally threaded portion 66.

Figure 8:
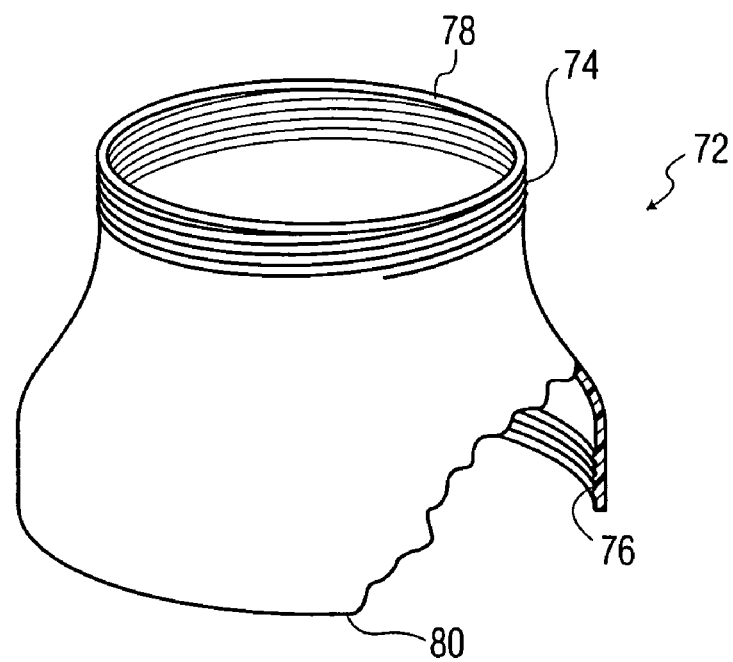
FIG. 8 is a coupling adapter for securing the device to a container for a second embodiment of the present invention.

Referring to FIG. 8, a coupling adapter 72 is shown for a second embodiment of the present invention. The coupling adapter 72 is designed to enable the device 10 to be coupled to externally threaded containers with larger diameter openings. The coupling adapter 72 includes an externally threaded portion 74 extending along an upper opening 78, and an internally threaded portion 76 extending along a lower opening 80 for attachment to a larger diameter opening of the container. The device 10 is attached to opening 78 of the adapter 72 through threaded engagement with the externally threaded portion 74. Correspondingly, the container is attached to the opening 80 of the adapter 72 through the threaded engagement with the internally threaded portion 76.

Figure 9:
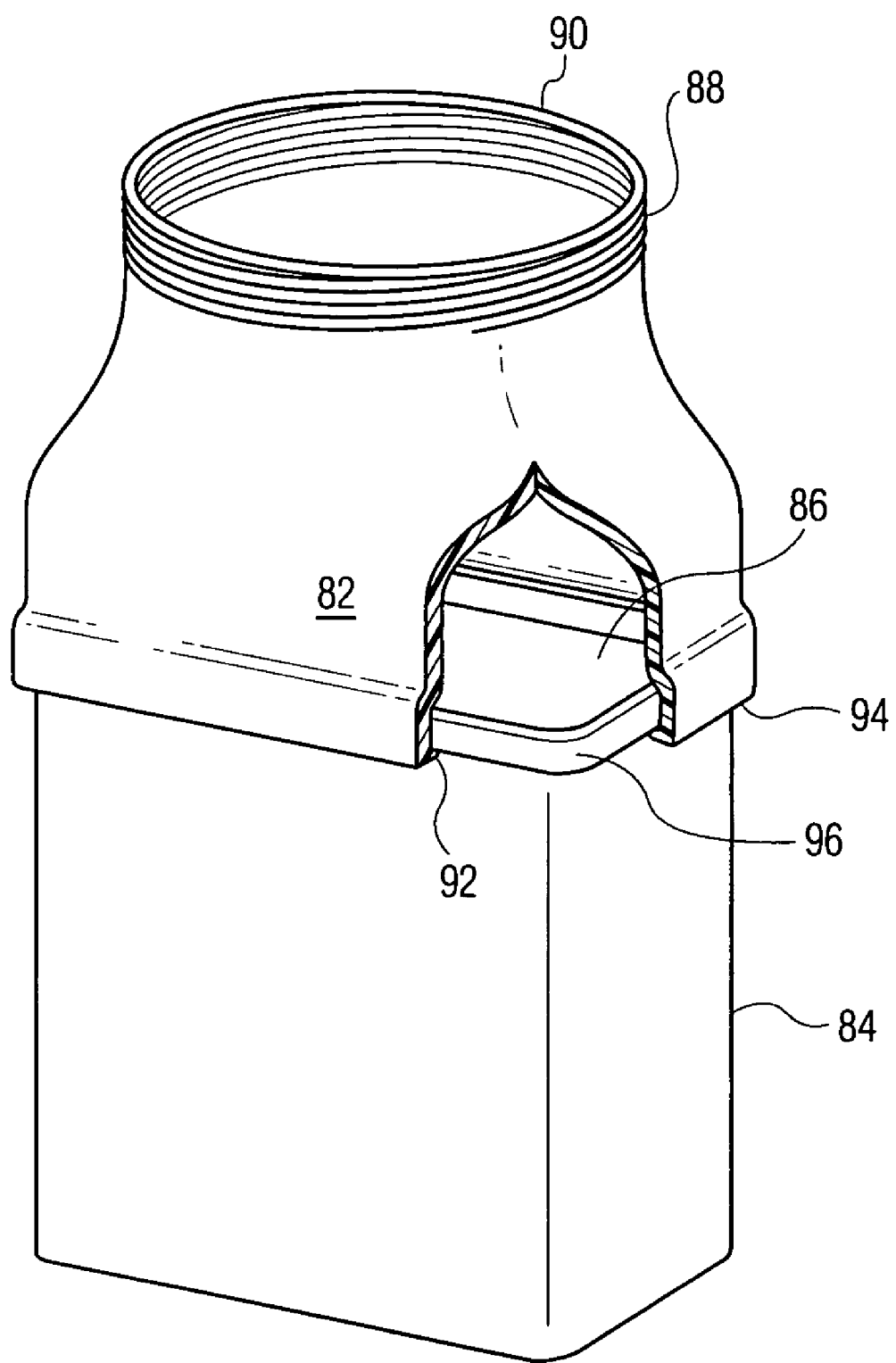
FIG. 9 is a coupling adapter for securing the device to a container for a third embodiment of the present invention.

Referring to FIG. 9, a coupling adapter 82 is shown for a third embodiment of the present invention. The coupling adapter 82 is designed to enable the device 10 to be coupled to a container 84 having a snap-on type of opening 86. The container 84 includes a flange portion 96 extending along the opening 86 that is capable of accommodating snap-on lids (not shown). The coupling adapter 82 includes an externally threaded portion 88 extending along an upper opening 90, and a ledge portion 92 extending along a lower opening 96 for attachment to a snap-on opening 86 of the container 84. The ledge portion 92 of the coupling adapter 82 engages with the flange portion 96 of the container 84 for secure coupling therebetween. The device 10 via its threaded portion 22 screws onto threads 88 of coupling adapter 82.

Figure 10:
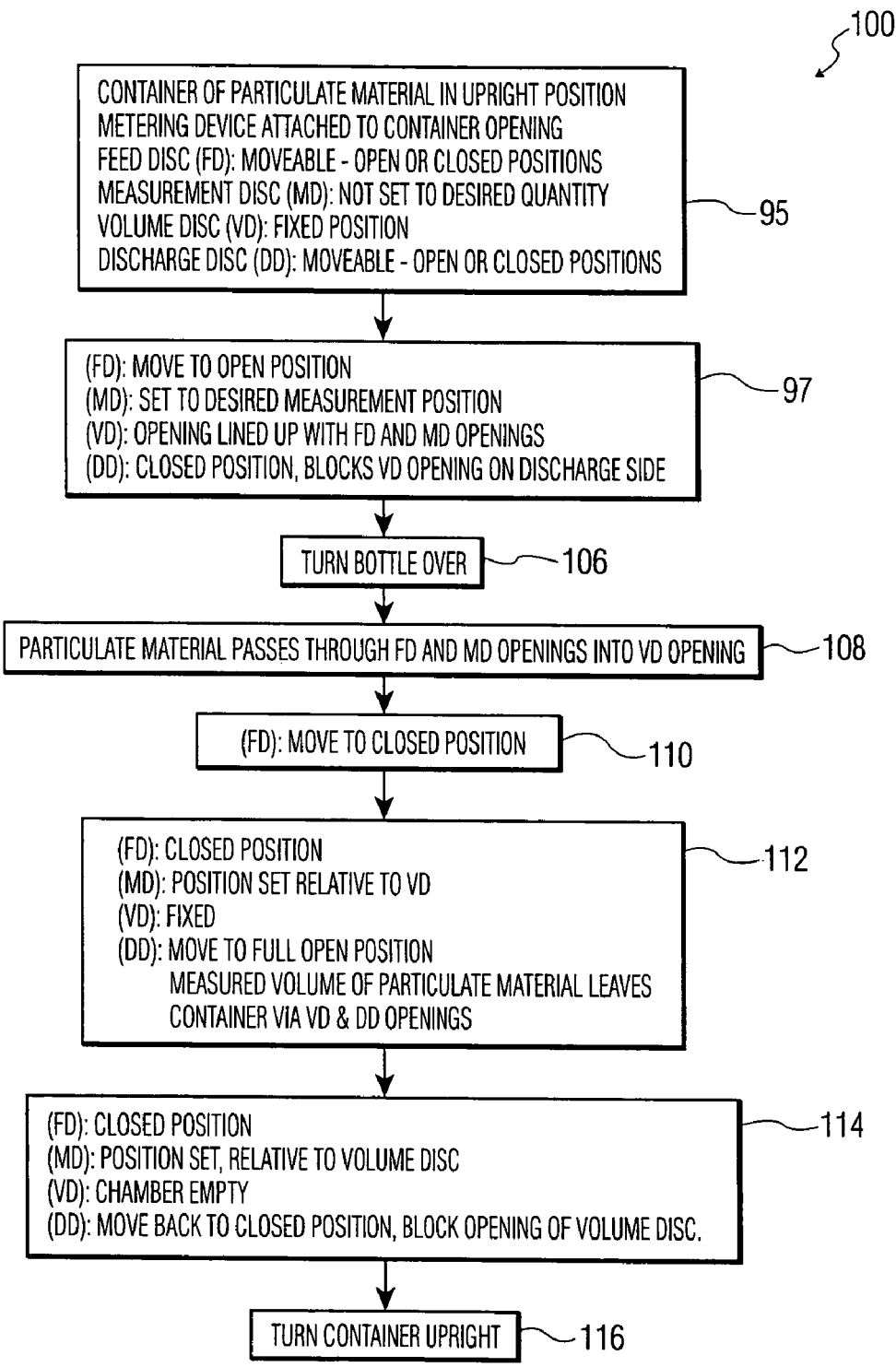
FIG. 10 is a flowchart illustrating the steps for operating the metering and dispensing device of FIG. 1A in accordance with one embodiment of the present invention.

Referring to FIG. 10, a flowchart 100 is shown to depict the operation steps of the metering and dispensing device 10. With reference to FIGS. 1 through 6E, the overall operation of the device 10 will be described herein. In step 102, the user maintains the container 12 in the upright position, and checks to ensure that the feed disc 30 is set in either the opened or closed positions, and that the discharge disc 36 is set in the closed position. In step 104, the feed disc 30 is moved via the lowermost tab 20 into the open position and the measuring disc 32 is moved via the intermediate tab 20 into a desired measurement position. In step 106, the user inverts or turns the container 12 with the device 10 positioned lower relative to the container 12 to cause the free flowing material 14 to flow into the metering and dispensing assembly 28.

In step 108, the free flowing material 14 passes through the feed opening 52 of the feed disc 30 and the measuring opening 54 of the measuring disc 32 into the volume channel 58 of the volume disc 34. The free flowing material 14 fills the portion of the volume channel 58 as defined by the barrier lip portion 56 of the measuring disc 32. In step 110, the user moves the feed disc 30 into the closed position via its associated tab 20. In step 112, the user moves the discharge disc 36 into the opened position through movement of topmost tab 20 to allow passage of the measured quantity of the free flowing material 14 occupying the volume channel 58 through the discharge opening 60 for dispensing. In step 114, the discharge disc 36 is moved back to the closed position through movement of the associated tab 20. In step 116, the container 14 is returned to the upright position for storage or re-use at a subsequent time. As previously indicated, the device 10 can be left attached to container 14 during storage, or removed therefrom.

In the preferred embodiment of the invention, the apertures or openings 52, 54, and 60 of the feed disc 30, measuring disc 32, and discharge disc 36, respectively, and the volumetric channel 58 of said volume disc, each take up no more than one-third the are of their associated disc. The three-side slots 18 of the housing are narrower than the width of their associated disc 30, 32, 34, 36, respectively. Also, the three tabs 20 are each slightly narrower than the width of the associated slot 18. The preset volume of the volumetric channel 58 of the volume disc 34, plus the exposed volume of the measuring disc 32 opening 54 overlying the exposed volumetric channel 58 is equal to the volume of particulate material to be dispensed.

By way of example, for the present device 10 to provide dispensing of a measured volume up to one tablespoon, the housing 16 will typically have a diameter of 1.75 inches (4.5 cm), and a height of 2.5 inches (6.0 cm). Note that one tablespoon is equal to 15 milliliters (ml). The diameters of the feed, measuring, volume, and discharge discs 30, 32, 34, 36, respectively, each have a diameter equal to one another, and slightly less than the 1.75 inches minus twice the wall thickness of housing 16. The thicknesses, in this example, for the feed disc 30, measuring disc 32, and discharge disc 36 are each 0.3 cm, whereas the thickness of the volume disc is 3.6 cm. The maximum volume of the volumetric channel 58 is about 15 ml. These calculations are based on 80% of the theoretical volume being available for receiving material 14 in the arcuate volume of the volumetric chamber or channel 58 of volume disc 34. An assumed unavailability of the total volume of the volumetric channel 58 is a result of considering interference to material by outside edge portions of volumetric channel 58, and the disc 34 center post pivotal point material that must be considered in that the volumetric channel 58 is not wholly pie shaped. The aforesaid dimensions are not meant to be limiting, but are given only for purposes of example to illustrate a possible sizing of device 10. As previously mentioned, the volume of the volumetric channel 58 can be adjusted by varying the height and/or diameter of volume disc 34. If the diameter of volume disc 34 is adjusted, the diameter of the feed, measuring, and discharge discs 30, 32, 36, and housing 16 must be adjusted accordingly. If the height of volume disc 34 is adjusted, the height of housing 16 must be adjusted accordingly.

In another embodiment of the invention, means are provide (not shown) for locking the measuring disc in place at each indicia 48 position. For example, an elongated slot can be provided in the volume disc 34 for retaining a locking pin that can be moved upward to engage one of a plurality of spaced apart measuring disc notches, with each notch being representative of a measurement or desired quantity position corresponding to one of the indicia 48.

The various embodiments of the invention as previously described provide the design for one configuration of the invention. An alternative embodiment of the invention generally incorporates the components for the configuration of the invention just described, whereby for this alternative embodiment as described in detail below, the components and outer case of the present device have been modified to both reduce the number of individual components, and provide for easier assembly of the device. However, operation of the alternative embodiment of the invention is substantially the same as described for the first configuration, with the exception being that in this second configuration, the discharge disc 36 of the first configuration has been incorporated into and made part of a single piece upper case member 102 (see FIG. 20). In this alternative configuration, the upper case member 102 is rotated in an appropriate clockwise or counterclockwise direction for either positioning the discharge opening 160 of the integral feed disc 136 over the opening 158 of the volume disc 134, or for positioning the discharge opening 160 over the closed portion of the top of the volume disc 134 for closing off the discharge opening 160. Note that in comparing the first configuration of the invention with the below-described second configuration for the invention, wherever possible, in the figures for this second configuration 100 has been added to the reference designations of the first configuration which respect to similar functioning elements between the two configurations.

Figure 11:
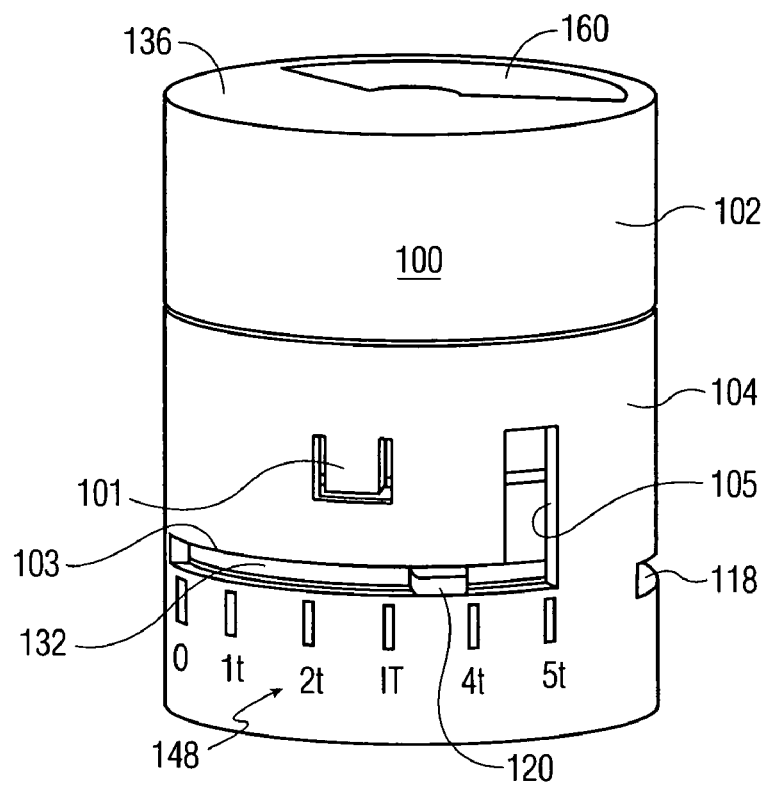
FIG. 11 shows a pictorial view looking toward one side of the assembled device for an alternative embodiment of the invention.
Figure 12:
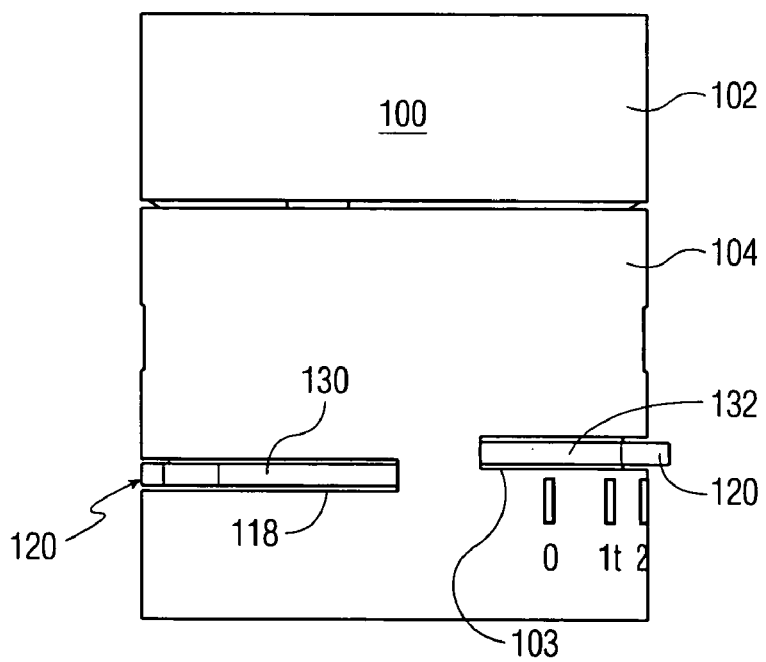
FIG. 12 is a pictorial view of the alternative embodiment of FIG. 11 with the device rotated about 90 degrees clockwise.

With reference to FIGS. 11 and 12, the second configuration for the invention includes an outer case formed from an upper case member 102 and a lower case member 104, which after installation of the internal components into the lower case member 104, are simply snapped together for completing assembly of the present device as will be described below. A lower locking finger 101 in the lower case member 104 is shown, as is an assembly slot 105 for permitting the tab 120 of feed disc 130 to be installed into its associated slot 118. The tab 120 of the feed disc 130 is shown protruding from its associated slot 118. In FIG. 12, the device has been rotated about 90 degrees counterclockwise relative to FIG. 11, and additionally shows a tab 120 of measuring disc 132 protruding from its associated slotway 103.

Figure 13:
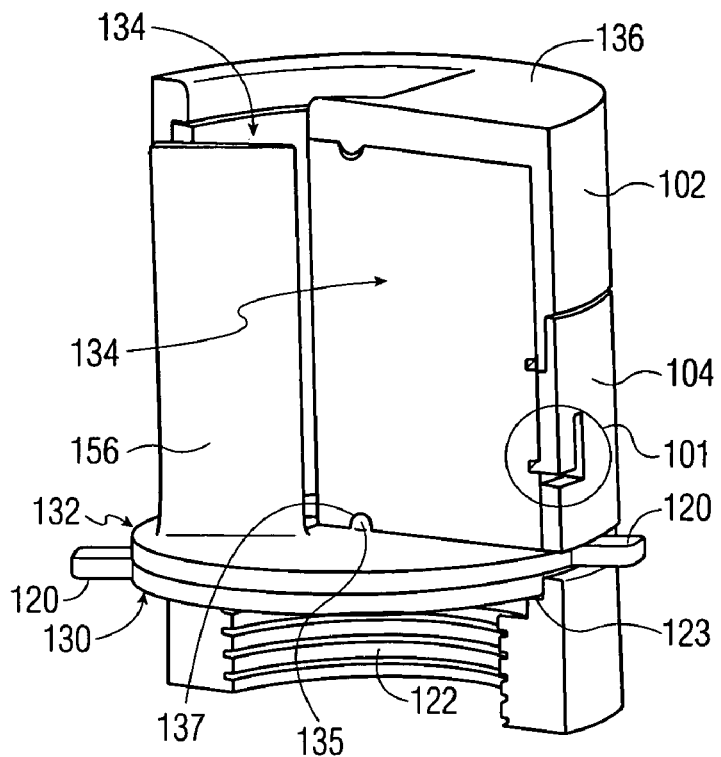
FIG. 13 is a partial cutaway pictorial view showing various details of the alternative embodiment of the invention.
Figure 14:
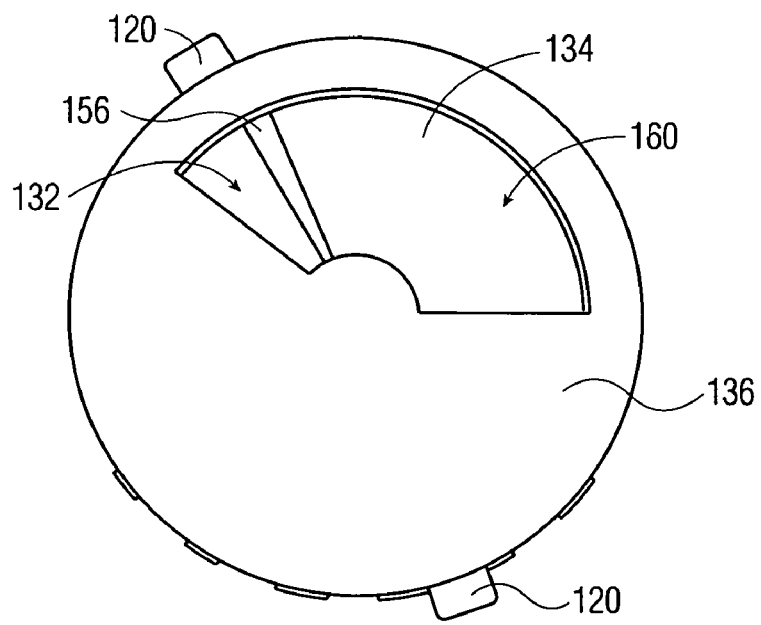
FIG. 14 is a top plan view of the alternative embodiment of the invention.
Figure 15:
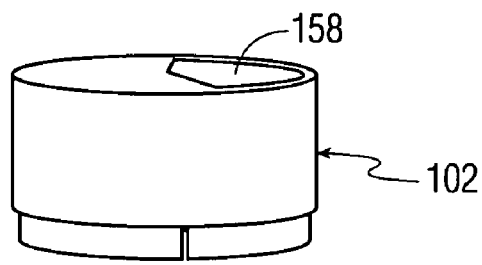
FIG. 15 is a pictorial view of an upper case member for the alternative embodiment of the present invention.
Figure 16:
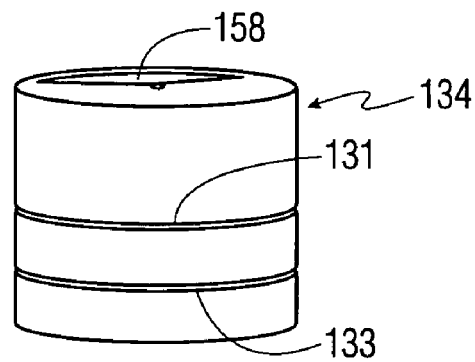
FIG. 16 is a pictorial view of a volume disc for the alternative embodiment of the invention.
Figure 17:
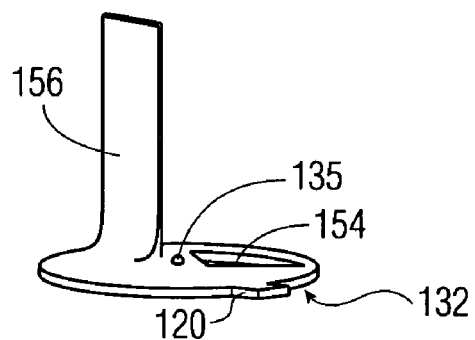
FIG. 17 is a pictorial view of a measuring disc for the alternative embodiment of the invention.
Figure 18:
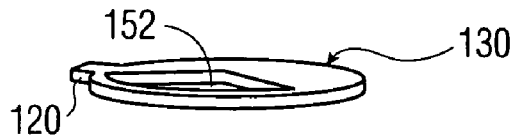
FIG. 18 is a pictorial view of a feed disc for the alternative embodiment of the invention.
Figure 19:
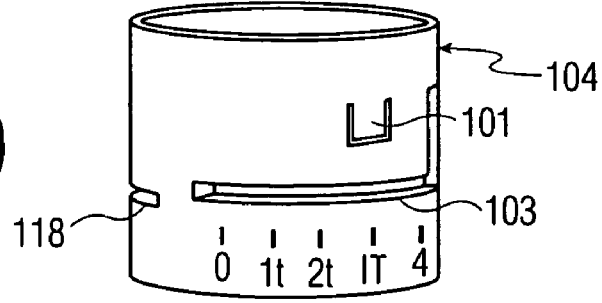
FIG. 19 is a pictorial view looking toward one side portion of a lower case member for the alternative embodiment of the invention.

FIG. 13, a partial cutaway view into the outer case of the device shows internal threads 122 in lower case member 104 for screwing onto the threaded opening of a container containing particulate material, such as a spice container, and portions of the feed disc 130, measuring disc 132, volume disc 134, and the discharge disc 136 as formed into and made integral with the upper case member 102, as previously described. Note that in this internal configuration, a centrally located male dimple 135 is shown interlocked into a centrally located female dimple 137 of volume disc 134. Similar male and female dimples are provided between feed disc 130 and measuring disc 132, and between volume disc 134 a bottom portion of the top of upper case member 102, for ensuring alignment therebetween, and preventing lateral movement of feed disc 130 and measuring disc 132 in slots 118, 103, respectively. A top view of the alternative device configuration is shown in FIG. 14.

Pictorial views of the upper case member 102, volume disc 134, measuring disc 132, feed disc 130, and lower case member 104 are shown in FIGS. 15 through 19, respectively. Also, these components are shown in an exploded assembly view in FIG. 20. During assembly, first the feed disc 130 is installed within the lower case 104 by turning the disc to first have its tab 120 protrude out of the lowermost slotway 118 of lower case member 104, whereafter feed disc 130 is centered to seat upon the step like circular ledge 123 of lower case member 104 (see FIG. 13). Next, the measuring disc 132 is tilted to permit its tab 120 to protrude into the assembly slot 105 of the lower case member 104, whereafter the measuring disc 130 is dropped downward until it is seated upon feed disc 130 with the associated male dimple 139 of feed disc 130 interlocked with an associated female dimple (not shown) of measuring disc 132. The tab 120 of the measuring disc 132 is positioned resting in its associated slotway 118 of the lower case member 104.

The volume disc 134 is installed by aligning its volume channel 158 to receive the barrier 156 of measuring disc 132, as the volume disc 134 is pushed downward into the lower case member 104. As the volume disc 134 is pushed downward, lower locking fingers 101 of the lower case member 104 will snap into the lower circular locking groove 133 of volume disc 134. Next, the volume disc 134 is rotated to cause its semicircular protruding locking rib 103 to engage a semicircular locking groove 107 located in an interior wall portion of the lower case member 104, for preventing rotation of the volume disc 134 within the outer case of the present device.

The last assembly step is to install the upper case member 102 by pushing its recessed circular bottom lip 162 onto the volume disc 134, whereby the upper locking fingers 109 of the upper case member 102 will engage or lock into the upper circular locking groove 131 of the volume disc 134, with the recessed circular lip of the upper case member 102 snuggly fitting into the recessed interior top portion 164 of the lower case member 104, with the bottom portion of the recessed circular lip 162 resting upon interior ledge 166 of the lower case member 104.

Figure 20:
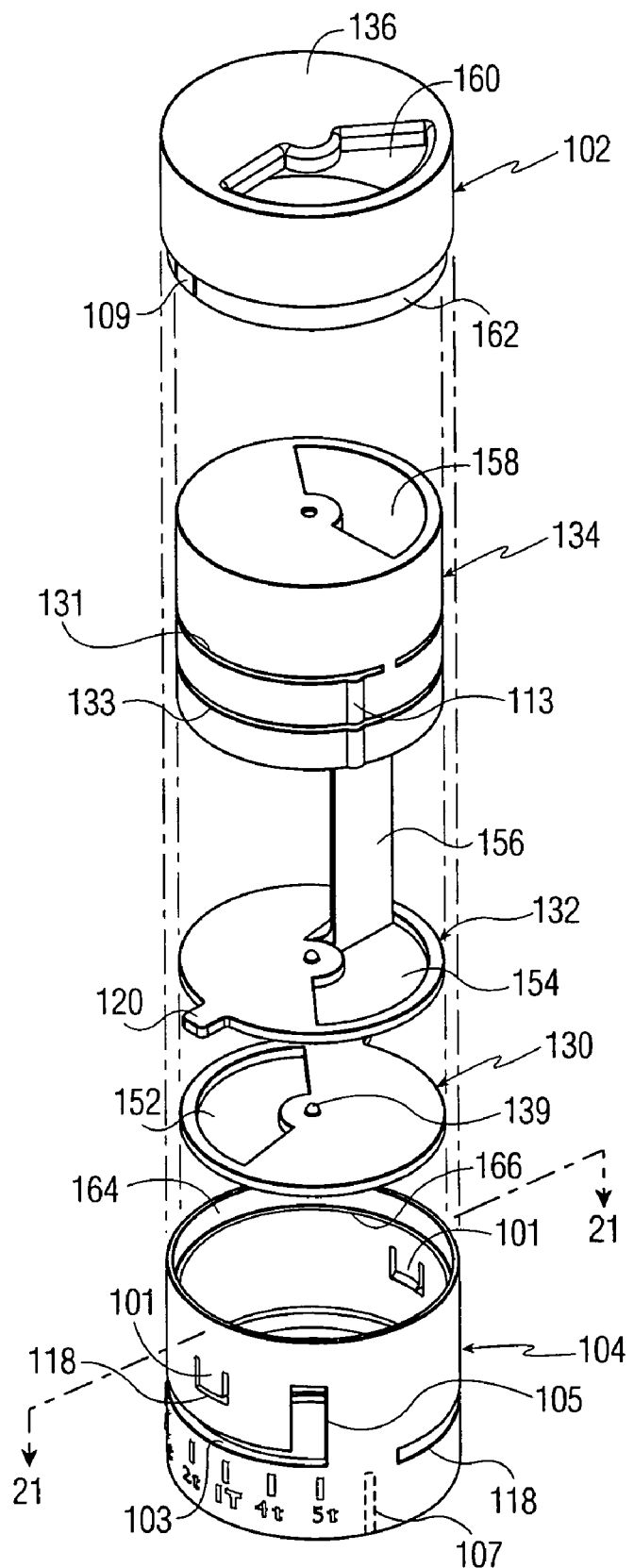
FIG. 20 shows an exploded assembly view for the alternative embodiment of the invention.
Figure 21:
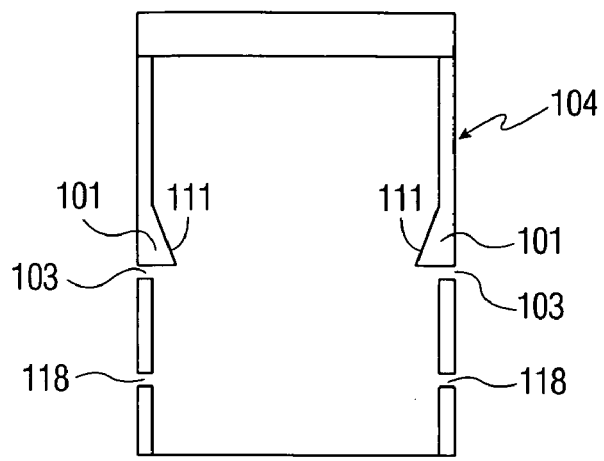
FIG. 21 shows a cross-sectional view taken along 21-21 of the lower case member of FIG. 20.
Figure 22:
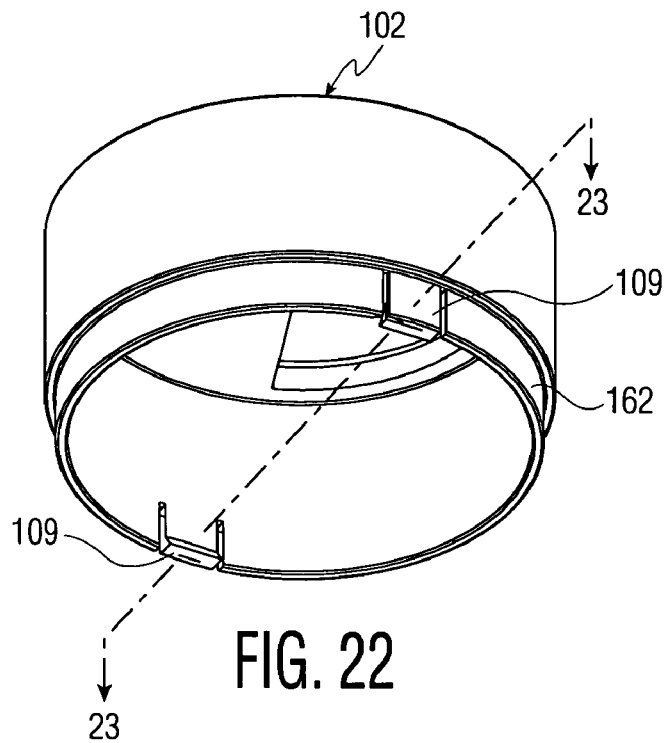
FIG. 22 is a pictorial view looking toward the bottom and side portions of the upper case member of the alternative embodiment of the invention.
Figure 23:
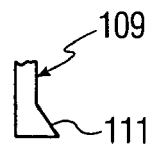
FIG. 23 is a partial cross-sectional view taken along 23-23 of FIG. 22 for showing the details of upper locking fingers for the alternative embodiment of the invention.

FIG. 21 shows a cross-section taken along 21-21 of FIG. 20, for showing details of the locking fingers 101. Similarly, FIG. 23 is a cross-sectional view taken along 23-23 of FIG. 22, for showing details of the locking fingers 109 of the upper case member 102. Note that the locking fingers 101 and 109 each include inward locking protrusions 111 for engaging the upper and lower locking grooves 131, 133, respectively, of the volume disc 134.

As previously described, operation of this second configuration of the invention is similar to that of the first configuration for the invention. The major difference being that the discharge disc 136 is incorporated into and integral with the upper case member 102, which is rotated clockwise or counterclockwise for blocking or unblocking the discharge opening 160.

Although various embodiments of the invention have been shown and described, they are not meant to be limiting. Those of skill in the art may recognize various modifications to these embodiments, which modifications are meant to be covered by the spirit and scope of the appended claims. For example, the volume disc 34 can have its volumetric channel 58 coated with a low friction non-toxic material such as Teflon, to reduce retention of particulate material 14 therein after dispensement. Also, the feed, measuring, volume, and discharge discs 30, 32, 34, 36, respectively, can each be made from a low friction, durable, non-toxic material such as Teflon, to enhance the operation and cleanliness of the device 10. In addition, in an another embodiment, the openings of the aforesaid discs can be made more pie shaped, or any other operable shape. Similar comments apply for the similar components of the alternative embodiment or configuration for the invention, more specifically, volume disc 134 and its volumetric channel 158, feed disc 130 of upper case member 102, measuring disc 132, and feed disc 136.

What is claimed is:

1. A method for making and operating a metering and dispensing device for particulate material comprising the steps of:

forming a cylindrical housing from an upper case member rotatable upon a lower case member, a free end of said upper case member being formed to provide an integral discharge disc and discharge end of said housing;

stacking successively within said housing from a free end of said lower case member to the discharge disc of said upper case member, a feed disc, a measuring disc, and a volume disc, each of said discs including an aperture or opening therethrough, said feed disc being proximate a free end of said lower case member providing a feed end of said housing, and said volume disc being fixed in position, whereas said feed, measuring, and discharge discs are each rotatable;

configuring the feed end of said housing to receive particulate material;

configuring the opening in said volume disc to serve as a volumetric channel or chamber having a maximum volume equal to the maximum volume or quantity of particulate material to be dispensed;

providing individual tabs extending from each one of said feed and measuring discs, respectively, with said tabs further extending through associated individual slotways in said housing, whereby said tabs permit manual rotation of said feed and measuring discs; and configuring the measuring disc to include a barrier lip proximate one end of its opening, for extending into the top of and for the full depth of the volumetric channel of said volume disc, whereby rotation of said measuring disc changes the volume of the volumetric chamber available for receiving particulate materials.

2. The method of claim 1, wherein the operation of said device includes the steps of:

attaching the feed end of said housing to the open top of an upright container of material to be dispensed;

moving said feed disc to a pre-established open position in which the opening of said feed disc opens into at least a portion of the opening of said measuring disc;

moving said measuring disc to a pre-established position for setting the volume of said volumetric channel to provide a desired volume or quantity of material to be dispensed;

rotating the upper case member to move said discharge disc to a pre-established closed position for blocking the bottom portion of the volumetric channel to prevent the flow of material therefrom;

inverting said container to allow particulate material to flow from said container, through the exposed overlying opening of said feed and measuring discs into said volumetric channel of said volume disc;

moving said feed disc to a closed position for blocking the flow of material in said volumetric channel; and rotating the upper case member to move said discharge disc to a pre-established open position for permitting the measured quantity of material to flow from said volumetric channel through the opening of said discharge disc, and out of the discharge end of said device.

3. The method of claim 1, further including obtaining the free flow of material from said device via the steps of:
moving said feed disc to its open position; and
rotating said upper case member to move said discharge disc to its open position while said container with said device attached is inverted, whereby material will continuously flow from said container, through the opening of said feed disc, the opening in said measuring disc, the channel of said volumetric disc, the opening of said discharge disc, and out of the discharge end of said housing.

4. The method of claim 2, wherein the openings of said feed, measuring, and discharge discs, and the volumetric channel of said volume disc are each arcuately shaped and proximate the circumference of their respective discs.

5. The method of claim 4, wherein the openings of said feed, measuring, and discharge discs, and said volumetric channel of said volume disc are no more than one-third the area of their respective disc.

* * * * *